Dec. 26, 1922.
W. F. McGOVERN,
CONSTRUCTION OF CONCRETE ROADS.
FILED JUNE 13, 1921.
1,440,162
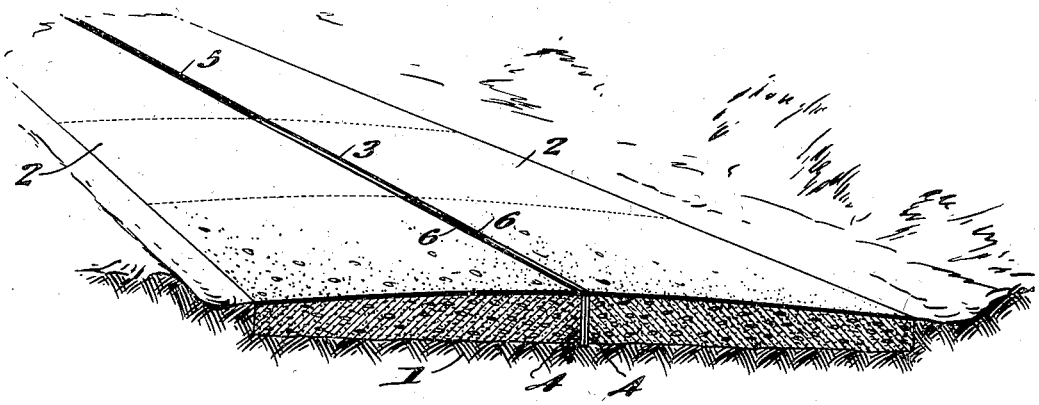
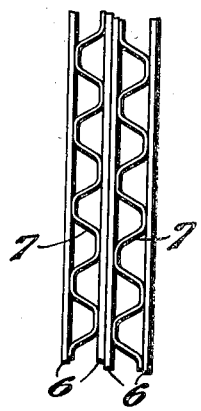
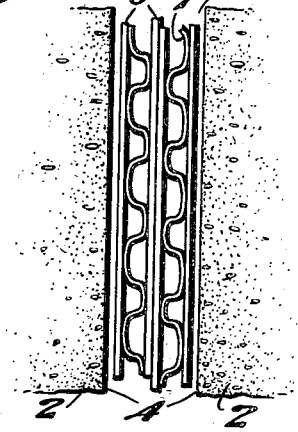
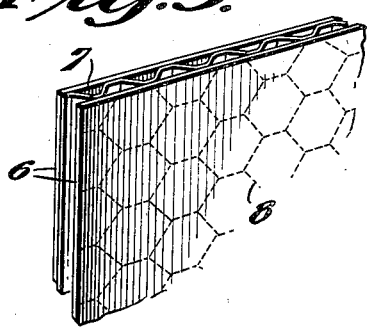
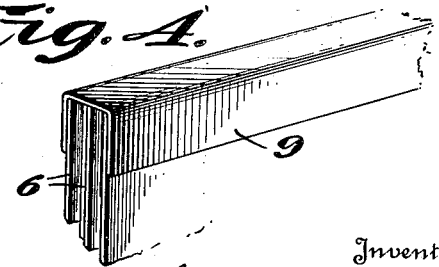
Inventor
Wm. F. McGovern.
By
Attorney Patented Dec. 26, 1922.

1,440,162

UNITED STATES PATENT OFFICE.

WILLIAM F. McGOVERN, OF TRENTON, NEW JERSEY.

CONSTRUCTION OF CONCRETE ROADS.

Application filed June 13, 1921. Serial No. 477,177.

*To all whom it may concern:*

Be it known that I, WILLIAM F. McGOVERN, a resident of Trenton, in the county of Mercer and State of New Jersey, a citizen of the United States, have invented certain new and useful Improvements in Construction of Concrete Roads, of which the following is a specification.

My invention relates to improvements in construction of concrete roads, which while particularly useful and efficient in the construction of such roads, may be employed in any situation or for any purpose where it would perform its functions in a proper manner.

The main object of my invention is the provision of a separating medium for the sections of concrete which will insure such sections being quickly made or cast in a perfect manner and which separating medium will retain the cement or concrete in proper position until the process of setting or hardening is practically completed and which separating medium will partially collapse by absorbing the moisture from the cement or concrete allowing for easy withdrawal of the separating medium and the provision of an even space between the sections for the insertion of the desired filling.

Another object of my invention is the provision of a separating medium which can easily be applied to the bed or base of the road and which will insure the making or casting of the cement or concrete sections in a rapid and perfect manner and which separating medium will possess the desired strength and rigidity to insure proper retention of the material until set or hardened, and which medium will absorb the moisture from the material sufficiently to cause a partial collapse of said separating medium to enable easy removal thereof and which absorption of moisture will naturally hasten the setting or hardening of the concrete or cement.

Another object of my invention is the provision of a separating device for providing the space forming the joint between the concrete or cement section, which device will be light in weight to render easy its application and removal; which will possess the necessary strength and rigidity and at the same time be sufficiently absorbent; which will be easily applied and removed and insure a smooth even space between the sections; and which from every point of view will be thoroughly efficient and practical.

With the attainment of the objects stated in view the invention in its broad term consists of a separating device for forming the joint space between cement or concrete sections adapted to retain the sections in proper position while being made or cast and absorbing moisture to partially collapse said section separating device and permit its ready removal.

The invention further consists of a separating device of the character and for the purpose stated embodying novel features of construction and combination of parts substantially as shown, described and particularly defined by the claims, it being understood that any changes desired may be made in the structure which fall within the scope of the claims.

In order that the construction, operation and manner of using my separating device may be clearly understood and its many advantages and features of merit be appreciated I have shown in the accompanying drawing, to which I invite attention, a complete embodiment of my invention.

Figure 1 represents a perspective view of a cement or concrete road made according to and using my separating device, said view showing two sections which have been completed and filling applied, two sections which have been made or cast ready for the filler, and two sections with my separating device in position between two sections and previous to being removed.

Fig. 2 represents a plan view on an enlarged scale illustrating the separating medium or device with parts in normal position.

Fig. 3 represents a plan view of portions of two concrete sections in cast condition with separating medium or device partially collapsed leaving space to permit ready removal of the device.

Fig. 4 represents a detail perspective view illustrating a cap or binder which may be found useful and desirable under certain conditions, and Fig. 5 represents a detail perspective view of a portion of a separating device having embedded therein a reinforcing means.

The improvement is shown as being used in connection with the manufacture or construction of sectional concrete or cement roads, but as before stated, it may be used for any purpose where it would serve, and in said drawings the numeral 1 designates the road bed or base which is to be surfaced, 2 designates the series of cement or concrete section and 3 designates the space or joint between the opposing faces 4 of said sections which space receives a suitable filler 5, the general appearance of the road surface thus constructed being of usual and common character and in connection with which space 3, my separating device is employed.

The separating device is most clearly shown in Figs. 2 and 3 and consists of twin members each composed of parallel vertical walls 6, between which is placed a corrugated spacing strip 7, and in use the separating device is placed upon the base or bed of the road, as shown in Fig. 1 and the cement poured at each side of the device, which separating device is made of a material which will sufficiently absorb the moisture from the cement or concrete to cause its partial collapse, after sufficient set or hardening of the material, when the said device will by such collapse leave a sufficient space, as seen in Fig. 3 to permit instant removal of the device leaving a perfectly even and smooth space between the sections to insure a proper joint between such sections.

In Fig. 5 the device has embedded therein a reinforcing means 8, of wire cloth or any other suitable material, while in Fig. 4 I provide a channeled shaped cap or binder 9 to fit over the top edge of the separating device which acts to protect such device from the entrance of concrete or foreign matter to insure easy working of the cement or concrete in the casting of the sections.

To persons skilled in the art of constructing or building roads of this character the many advantages and features of merit of this improvement will be instantly understood and appreciated and comment thereon is deemed unnecessary, but it must be seen that I provide a simple, durable, cheap and efficient device which will save time and labor in the building of concrete roads, will hasten the construction of such roads and will insure an absolutely perfect joint between the sections.

I claim:

1. In combination with sections of material, a separating medium for forming a space between said sections said medium being partially collapsible to permit its removal and consisting of parallel strips spaced a suitable distance apart and a collapsible means disposed betwen said strips to maintain the strips in spaced relation until absorption occurs.

2. In combination with a separating device of the character described, a protecting cap or binder fitting the upper edges of said device.

3. A separating medium or device having its walls made of moisture absorbing material, and reinforcing means embodied in said walls.

In testimony whereof I hereunto affix my signature.

WILLIAM F. McGOVERN.